US012682286B2

(12) United States Patent
Kumar

(10) Patent No.: US 12,682,286 B2
(45) Date of Patent: Jul. 14, 2026

(54) GENERATING OPPORTUNITY PROFILE INSIGHTS

(71) Applicant: Oracle International Corporation, Redwood Shores, CA (US)

(72) Inventor: Vivek Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 18/319,395

(22) Filed: May 17, 2023

(65) Prior Publication Data

US 2024/0386316 A1 Nov. 21, 2024

(51) Int. Cl.
*G06N 20/00* (2019.01)

(52) U.S. Cl.
CPC ..................................... *G06N 20/00* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | |
|---|---|---|---|
| 10,489,462 | B1 | 11/2019 | Rogynskyy et al. |
| 10,621,508 | B2 | 4/2020 | Kataria et al. |
| 11,507,967 | B1 | 11/2022 | Shah |

| | | | |
|---|---|---|---|
| 2008/0109399 | A1 | 5/2008 | Liao et al. |
| 2009/0234710 | A1 | 9/2009 | Belgaied et al. |
| 2009/0248599 | A1* | 10/2009 | Hueter ............... G06Q 30/0631 706/15 |
| 2011/0276372 | A1 | 11/2011 | Spivack et al. |
| 2017/0147675 | A1* | 5/2017 | Han ........................ G06F 16/35 |
| 2017/0279829 | A1* | 9/2017 | Vasseur ............... H04L 63/1458 |
| 2018/0060411 | A1* | 3/2018 | Kanuri .................. G06F 16/285 |
| 2018/0268298 | A1 | 9/2018 | Johansen et al. |
| 2019/0018835 | A1 | 1/2019 | Bhowmick et al. |
| 2020/0027170 | A1 | 1/2020 | Archer et al. |
| 2020/0184016 | A1 | 6/2020 | Roller |
| 2020/0372561 | A1 | 11/2020 | Sanghavi et al. |
| 2021/0366619 | A1* | 11/2021 | Chen .................. A61B 5/02055 |
| 2022/0043691 | A1* | 2/2022 | Willemain ............ G06F 9/5027 |
| 2022/0245557 | A1* | 8/2022 | Minter ................... G06N 20/00 |
| 2022/0293107 | A1 | 9/2022 | Leaman et al. |
| 2022/0343250 | A1 | 10/2022 | Tremblay et al. |

\* cited by examiner

*Primary Examiner* — Hung D Le
(74) *Attorney, Agent, or Firm* — Invoke

(57) ABSTRACT

A clustering model is used to partition a set of historical opportunity profiles representing historical opportunities into a plurality of opportunity profile clusters. A target opportunity profile that includes a plurality of target-opportunity parameters is obtained, and an opportunity profile cluster is identified that meets a matching criterion with the target opportunity profile. The plurality of historical opportunity profiles of the identified opportunity profile cluster are partitioned based on an outcome indicator associated respectively with each of the plurality of historical opportunity profiles, providing a first subset of historical opportunity profiles and a second subset of historical opportunity profiles. An insight generation model is applied to the target opportunity profile along with the first subset and/or the second subset to generate one or more insights for the target opportunity profile.

33 Claims, 5 Drawing Sheets

102

Opportunity Profile Clusters <u>110</u>

Opportunity Profile Cluster <u>110a</u>

108

112

| Opportunity Profile | — | Outcome Indicator |
108a | | | 112a

| Opportunity Profile | — | Outcome Indicator |
108b | | | 112b

Opportunity Profile Cluster <u>110b</u>

108

112

Subset <u>114a</u>

| Opportunity Profile | — | Outcome Indicator |
108c | | | 112c

| Opportunity Profile | — | Outcome Indicator |
108d | | | 112d

Subset <u>114b</u>

| Opportunity Profile | — | Outcome Indicator |
108e | | | 112e

| Opportunity Profile | — | Outcome Indicator |
108f | | | 112f

FIG. 1B

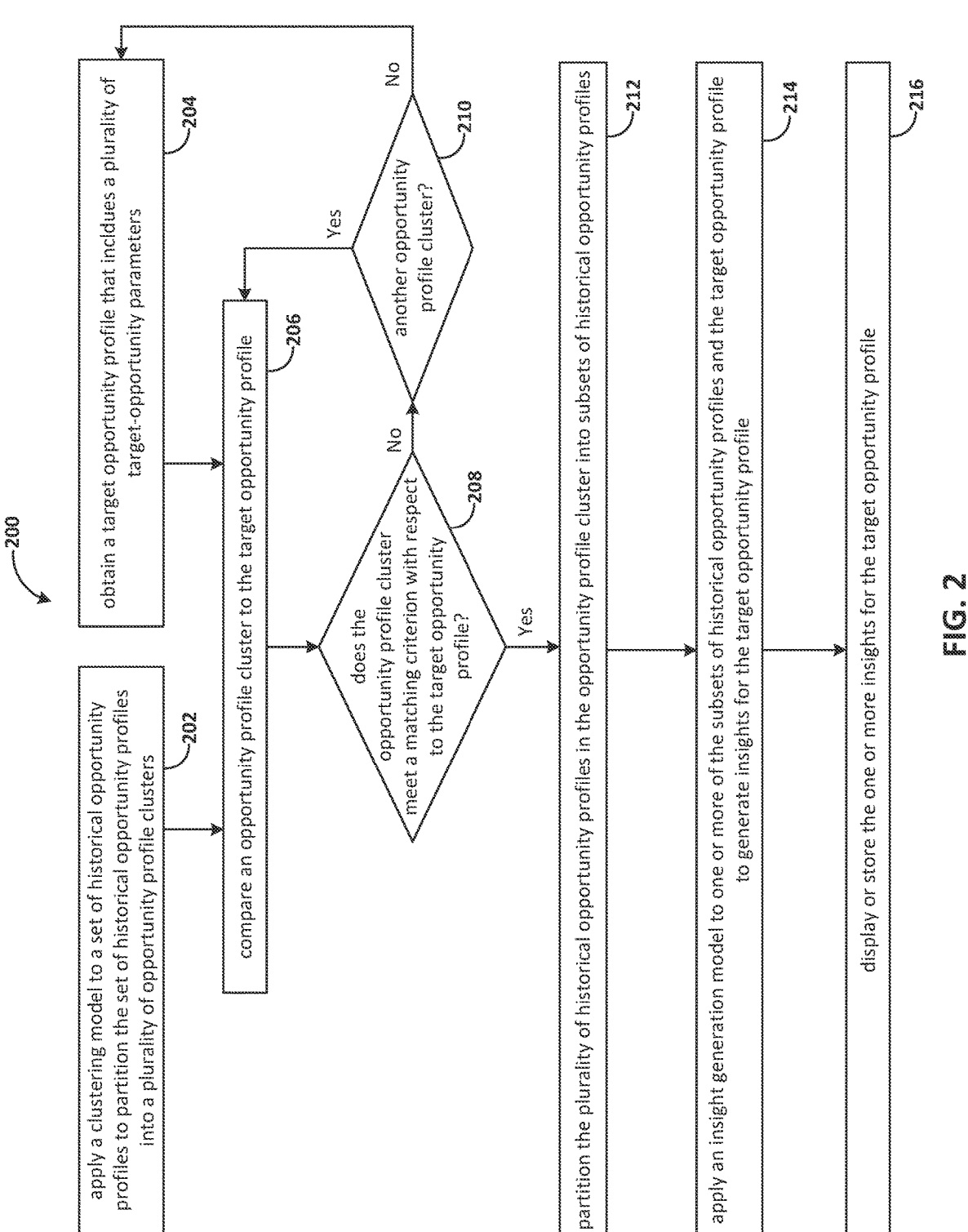

200

202 — apply a clustering model to a set of historical opportunity profiles to partition the set of historical opportunity profiles into a plurality of opportunity profile clusters 204 — obtain a target opportunity profile that incldues a plurality of target-opportunity parameters 206 — compare an opportunity profile cluster to the target opportunity profile 208 — does the opportunity profile cluster meet a matching criterion with respect to the target opportunity profile?

210 — another opportunity profile cluster?

212 — partition the plurality of historical opportunity profiles in the opportunity profile cluster into subsets of historical opportunity profiles 214 — apply an insight generation model to one or more of the subsets of historical opportunity profiles and the target opportunity profile to generate insights for the target opportunity profile 216 — display or store the one or more insights for the target opportunity profile

FIG. 2

GENERATING OPPORTUNITY PROFILE INSIGHTS

TECHNICAL FIELD

The present disclosure relates to cluster analysis.

BACKGROUND

Cluster analysis may be used to group a set of objects in such a way that objects within the same group or cluster are more similar to each other than to those in other clusters. Cluster analysis is generally used to search for patterns or structures in a dataset representing the objects, by grouping the objects into clusters based on their similarity.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings:

FIG. 1B illustrates features of a data repository including opportunity profile clusters in accordance with one or more embodiments;

FIG. 2 illustrates example operations that may be performed by the system in accordance with one or more embodiments;

DETAILED DESCRIPTION

Figure 1A:
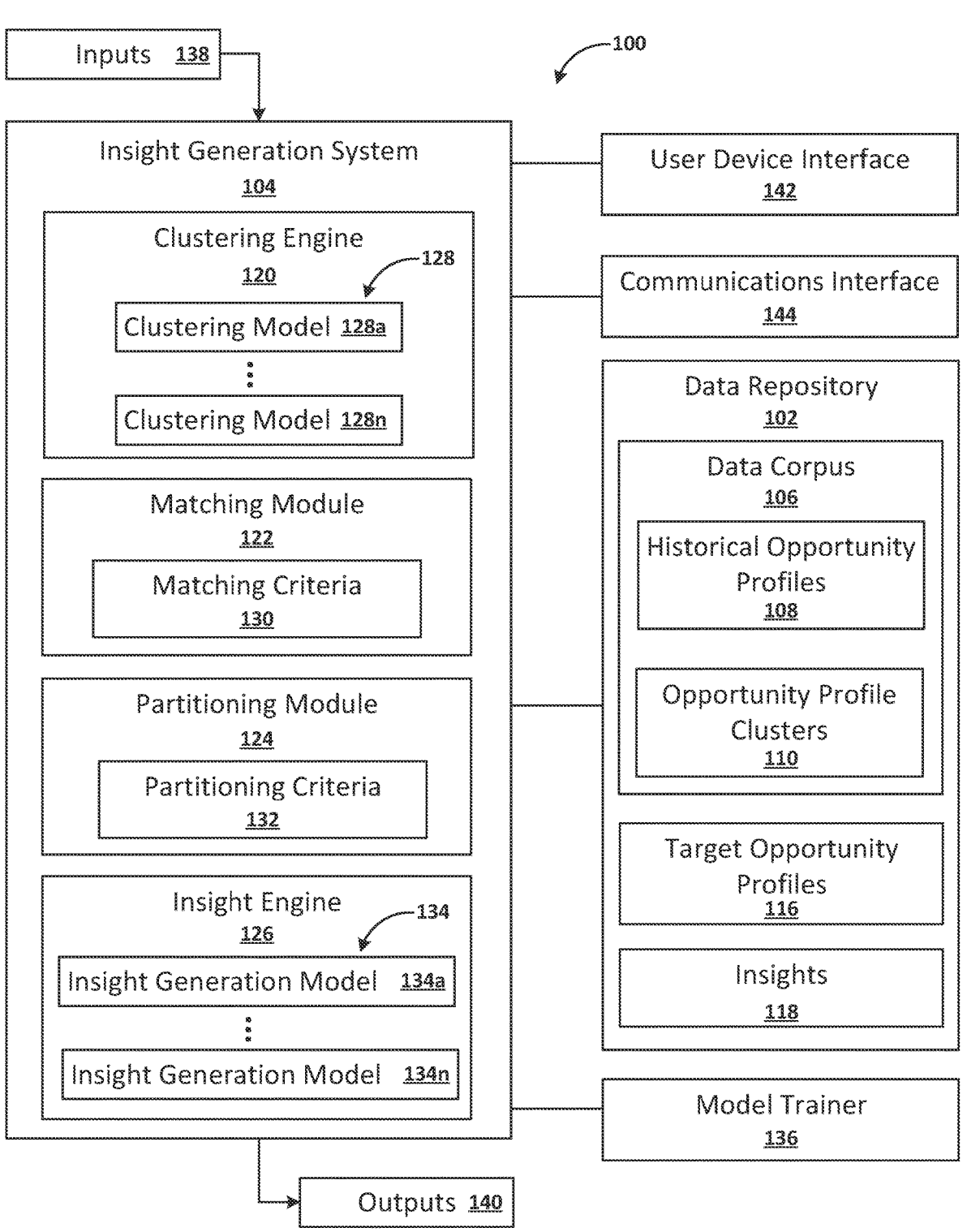
FIG. 1A illustrates a system that includes a data repository and an insight generation system in accordance with one or more embodiments.

In the following description, for the purposes of explanation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with features described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. INSIGHT GENERATION SYSTEM
3. GENERATING INSIGHTS FOR TARGET OPPORTUNITIES
4. EXAMPLE INSIGHTS
5. PRACTICAL APPLICATIONS, ADVANTAGES & IMPROVEMENTS
6. COMPUTER NETWORKS AND CLOUD NETWORKS

7. MICROSERVICE APPLICATIONS
8. HARDWARE OVERVIEW
9. MISCELLANEOUS; EXTENSIONS

1. General Overview

One or more embodiments generate an insight(s) for a target opportunity. The insight(s) may lead to a conversion of the target opportunity. The conversion may, for example, include completion of a sale or a goal with respect to the target opportunity. Initially, a system applies a clustering model to partition historical opportunity profiles into a set of historical opportunity profile clusters. The system then selects a particular historical opportunity profile cluster to be used in an insight generation process to generate an insight for the target opportunity. Selecting the particular historical opportunity profile cluster may include determining that that the particular historical opportunity profile cluster meets one or more matching criteria with respect to the target opportunity. The system selects a subset of historical opportunity profiles, from the particular historical opportunity profile cluster, based on an outcome indicator corresponding to each of the subset of historical opportunity profiles. In an example, the system may select the subset of historical opportunity profiles that correspond to a positive outcome such as a successful conversion. In another example, the system may select the subset of historical opportunity profiles that correspond to a negative outcome such as a failure of conversion. The system applies an insight generation model to the selected subset of historical opportunity profiles and the target opportunity to generate an insight for the target opportunity. The insight may identify a parameter that is determined to be prevalent in the selected subset of historical opportunity profiles but missing from the target opportunity profile. The parameter may include, for example, a particular discount, free add-on that is offered with purchased services/products, or client contact that was involved in successfully converted historical opportunities.

The insights generated by the insight generation model may identify opportunity parameters that (a) are missing from the subset of historical opportunity profiles to which the target opportunity profile is being compared, or (b) differ as between the target opportunity profile and the subset of historical opportunity profiles. The insight may guide a user to add a parameter missing from a target opportunity profile, or remove a parameter currently included in the target opportunity profile. In one example, the missing or different opportunity parameters may provide insights as to opportunity parameters that may have influenced the outcome of the historical opportunity profiles in the opportunity profile cluster.

This General Overview section is intended to provide a general overview without addressing all aspects of the present disclosure. The full scope of the presently disclosed subject matter is understood from the content of the present disclosure in its entirety.

2. Insight Generation System

Referring now to FIGS. 1A and 1B, example systems are described. As shown in FIGS. 1A and 1B, a system 100 in accordance with one or more embodiments may be associated with operations in accordance with the present disclosure, and more particularly, insight generation operations that generate insights for target opportunity profiles based on historical opportunity profiles.

The term "target opportunity profile" refers to an opportunity profile for a target opportunity. The term "target opportunity" refers to an opportunity that may be compared with one or more opportunity profile clusters that include a plurality of historical opportunity profiles. A target opportunity may include an opportunity that is currently being pursued or that may be pursued in the future.

The term "historical opportunity profile" refers to an opportunity profile for a historical opportunity. The term "historical opportunity" refers to an opportunity that was at least partially performed in the past. A historical opportunity may include an opportunity with respect to which pursuit of the opportunity is complete, or partially complete.

The system 100 may include a data repository 102 and an insight generation system 104 communicatively coupled or couplable with one another. The data repository 102 may include data utilized and/or stored by the insight generation system 104 in association with various operations. The insight generation system 104 may include hardware and/or software configured to carry out the various operations. The various operations may include insight generation operations, such as identifying historical opportunity profile clusters that meet matching criteria with target opportunity profiles, partitioning opportunity profile clusters into subsets of historical opportunity profiles based on outcome indicators, and generating insights for the target opportunity profile based on a respective subset of historical opportunity profile corresponding to a respective outcome indicator. Examples of operations are further described below with reference to FIG. 2.

In one or more embodiments, the system 100 may include more or fewer components than the components shown in FIGS. 1A and 1B. The components shown in FIGS. 1A and 1B may be local to or remote from each other. The components shown in FIGS. 1A and 1B may be implemented in software and/or hardware. Each component may be distributed over multiple applications and/or machines. Multiple components may be combined into one application and/or machine. Operations described with respect to one component may instead be performed by another component.

A. Data Repository Features.

In one or more embodiments, a data repository 102 may include any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or executed on the same computing system as the insight generation system 104. Additionally, or in the alternative, a data repository 102 may be implemented or executed on a computing system separate from the insight generation system 104. The data repository 102 may be communicatively coupled to the insight generation system 104 via a direct connection or via a network.

i. Historical Opportunity Profiles.

The data repository 102 may include a data corpus 106 that contains content accessible by the insight generation system 104. The data corpus 106 may include a set of historical opportunity profiles 108. Each of the historical opportunity profiles 108 may represent a historical opportunity. The historical opportunity profiles 108 may be arranged in a data structure of the data corpus 106 that includes, for each historical opportunity, an identifier of the opportunity, a plurality of opportunity parameters associated with the opportunity, and at least one outcome indicator for the opportunity. The historical opportunity profiles 108 may be associated with a historical opportunity in one or more fields of opportunity, such as business development, sales, marketing, consulting, product development, process improvement, or business transactions (e.g., sales, acquisitions, mergers, etc.). As further examples, a historical opportunity may be associated with research, real estate development, recruiting, campaigning, grant seeking, advocacy, lobbying, politics, or the like.

ii. Opportunity Parameters.

The plurality of opportunity parameters may include at least one of: transaction parameters, segmentation parameters, personnel parameters, or prospect parameters. An outcome indicator associated with a historical opportunity profile 108 may indicate, with respect to the historical opportunity, one or more characteristics pertaining to at least one of: an outcome, a result, a reaction, an effect, a consequence, a decision, an aftermath, a conclusion, a materialization.

The opportunity parameters may include values or variables associated with the opportunity that may define or describe one or more aspects of an opportunity. The opportunity parameters may include features, characteristics, conditions, criteria, or limits pertaining to the opportunity. The opportunity parameters may include numerical values, qualitative values, statistical values, measured values, or calculated values. One or more opportunity parameters pertaining to a particular opportunity may be utilized, individually or in combination, to make inferences about the opportunity. Additionally, or in the alternative, one or more opportunity parameters may be utilized, individually or in combination, to make inferences about a group or category of historical opportunities. In one example, an inference can be made about a group or category of historical opportunities based on one or more opportunity parameters from a sample of historical opportunities.

The opportunity parameters may include objective parameters or subjective parameters. The term "objective parameter" refers to an opportunity parameter that is factual or unbiased. Objective parameters include opportunity parameters that are based on measurable or observable empirical information. Objective parameters may be qualitative or quantitative. The term "subjective parameter" refers to an opportunity parameter that is based on an individual's opinion, feeling, belief, or interpretation. Subjective parameters include opportunity parameters based in information provided by a person, including information that may vary from person to person, or depending on the particular person providing the information. Subjective parameters may be qualitative or quantitative. In one example, a subjective parameter may include a rating, an assessment, and evaluation, or a score.

The transaction parameters may include parameters pertaining to one or more transactional aspects of an opportunity. The transactional aspects of an opportunity may include one or more of: a name of products or services included in an offering, financial aspects of an offering, timing aspects of an offering, service obligations, terms and conditions, performance indicators, or the like. In one example, transaction parameters may include at least one of: a name of an offering (e.g., a product or service), a scope of the offering, a dollar value for the offering, a fee structure for the offering, a closing date for the offering, or a service duration for the offering. In one example, transaction parameters may include a primary offering (e.g., a product or service) and a secondary offering (e.g., a product or service). The primary offering and the secondary offering may represent alternative offerings, or a bundled offering.

Performance indicators may include one or more of: total sales value, return on investment (ROI), return on equity (ROE), return on assets (ROA), return on sales (ROS), return on marketing investment (ROMI), gross profit margin (GPM), customer acquisition cost (CAC), customer lifetime value (CLV), sales cycle length, time to close, or the like.

The segmentation parameters may include parameters pertaining to one or more factors upon which opportunities may be segmented. As examples, the segmentation parameters may include one or more of: industry parameters, market parameters, distribution channel parameters, demographic parameters, geographic parameters, psychographic parameters, behavioral parameters, attitudinal parameters, firmographic parameters, need-based parameters, use-based parameters, loyalty-based parameters, cultural parameters, political parameters, or economic parameters.

The personnel parameters may include parameters pertaining to one or more personnel associated with pursuing the opportunity, such as a team of personnel. As examples, the personnel parameters may include for one or more personnel associated with an opportunity, at least one of: a name, a title, or a role. A personnel parameter may identify a person's role with respect to an opportunity, including one or more of the following roles: team leader, manager, knowledge worker, support staff, or external resource. A personnel parameter may include an indication of a person credited with originating or initially identifying an opportunity. A personnel parameter may include an indication of one or more parameters associated with a person's past performance. The parameters associated with a person's past performance may include one or more of: level of experience, tenure, rank, number of opportunities worked, conversion rate, success rate, performance reviews, peer reviews, or the like.

In one example, the personnel parameters may include an influencer parameter that indicates whether or an extent to which a person pursuing the opportunity is regarded as an influencer. For example, a person considered influential in an outcome of the opportunity may be identified as an influencer for the opportunity. An influencer parameter may be determined based at least in part on one or more other opportunity parameters. The influencer parameter may include a metric based on one or more of: experience, results, or peer reviews. The influencer parameter may represent a positive influence or a negative influence. The influencer parameter may include a numerical score, such as a score on a range from 1 to 10. Additionally, or in the alternative, the influencer parameter may include a qualitative score, such as a YES/NO indicator that indicates whether the person is an influencer, or an indicator of an extent to which the person is an influencer (e.g., HIGH/MEDIUM/LOW).

The prospect parameters may include parameters pertaining to one or more personnel associated with a prospect, such as a team of personnel. As examples, the prospect parameters may include for one or more personnel associated with a prospect, at least one of: a name, a title, or a role. A prospect parameter may include an indication of a person designated as a primary point of contact for an opportunity. A prospect parameter may identify a person's role with respect to the prospect, including one or more of the following roles: team leader, manager, knowledge worker, support staff, or external resource. A prospect parameter may include an indication of one or more parameters associated with a person's past performance. The parameters associated with a person's past performance may include one or more of: level of experience, tenure, rank, number of opportunities worked, conversion rate, success rate, performance reviews, peer reviews, or the like.

In one example, the prospect parameters may include an advocate parameter that indicates whether or an extent to which a person associated with a prospect is regarded as an advocate for the opportunity. For example, a person who advocated for, or was supportive of, an outcome of the opportunity may be identified as an advocate for the opportunity. An advocate parameter may be determined based at least in part on one or more other opportunity parameters. The advocate parameter may include a metric based on one or more of: experience, results, or peer reviews. The advocate parameter may include a numerical score, such as a score on a range from 1 to 10. Additionally, or in the alternative, the advocate parameter may include a qualitative score, such as a YES/NO indicator that indicates whether the person is an advocate, or an indicator of an extent to which the person is an advocate (e.g., HIGH/MEDIUM/LOW).

Additionally, or in the alternative, the prospect parameters may include a detractor parameter that indicates whether or an extent to which a person associated with a prospect is regarded as a detractor for the opportunity. For example, a person who opposed, or was unsupportive of, an outcome of the opportunity may be identified as a detractor for the opportunity. A detractor parameter may be determined based at least in part on one or more other opportunity parameters. The detractor parameter may include a metric based on one or more of: experience, results, or peer reviews. The detractor parameter may include a numerical score, such as a score on a range from 1 to 10. Additionally, or in the alternative, the detractor parameter may include a qualitative score, such as a YES/NO indicator that indicates whether the person is a detractor, or an indicator of an extent to which the person is a detractor (e.g., HIGH/MEDIUM/LOW).

Additionally, or in the alternative, the prospect parameters may include a gatekeeper parameter that indicates whether or an extent to which a person associated with a prospect is regarded as a gatekeeper for the opportunity. For example, a person who has formal or informal decision-making authority may be identified as a gatekeeper for the opportunity. A gatekeeper parameter may be determined based at least in part on one or more other opportunity parameters. The gatekeeper parameter may include a metric based on one or more of: experience, results, or peer reviews. The gatekeeper parameter may include a numerical score, such as a score on a range from 1 to 10. Additionally, or in the alternative, the gatekeeper parameter may include a qualitative score, such as a YES/NO indicator that indicates whether the person is a gatekeeper, or an indicator of an extent to which the person is a gatekeeper (e.g., HIGH/MEDIUM/LOW).

iii. Fields of Opportunity.

As mentioned, a historical opportunity profile 108 may be associated with a historical opportunity in one or more fields of opportunity. In one example, an opportunity in the field of business development or sales may include one or more activities associated with an offering, for example, pertaining to a product or service. As examples, activities associated with a business development or sales offering may include lead generation, relationship development, negotiating, contracting, fulfillment, delivery, payment, invoicing, or customer service. The offering may pertain to a new or existing prospect, such as a customer, a client, or a sales pipeline. As examples, the offering may include selling a product or service to a new or existing prospect, identifying a new prospect, entering a formal or informal relationship with a prospect, or advancing to a next stage in a relationship with a prospect.

In one example, an opportunity in the field of marketing may include one or more activities associated with a marketing initiative, for example, pertaining to a product, service, campaign, or promotional activity. The marketing initiative may pertain to a new or existing product, service, campaign, or promotional activity. As examples, the marketing initiative may include generating awareness, interest, or engagement among a target audience, such as by advertising, email marketing, social media campaigns, events, or public relations activities.

In one example, an opportunity in the field of consulting may include one or more activities associated with providing advice, guidance, or support to clientele. As examples, an opportunity associated with consulting may include analysis, assessment, strategy development, project management, training, change management, or providing technical expertise.

In one example, an opportunity in the field of product development may include one or more activities associated with designing, developing, or bringing to market a new or improved product or service offering. As examples, an opportunity associated with product development may include idea generation, concept development, product design, prototyping, testing, validation, manufacturing, production, launch, or commercialization.

In one example, an opportunity in the field of process improvement may include one or more activities associated with identifying, analyzing, developing, or implementing a process improvement, for example, pertaining to operations of an organization, an entity, or a facility. As examples, a process improvement opportunity may include improving operations, improving efficiency, reducing cost, increasing quality, increasing reliability, reducing variability, reducing waste, streamlining, automating, standardizing, or identifying and resolving problems.

In one example, an opportunity in the field of business transactions may include one or more activities associated with an offering, for example, pertaining to a business transaction such as a merger, an acquisition, or a sale of a business entity or a line of business. As examples, activities associated with a business transactions opportunity may include lead generation, relationship development, due diligence, valuation, negotiating, contracting, financing, closing, integration planning, or regulatory compliance. The offering may pertain to a new or existing prospect, such as an acquiring entity, a selling entity, or other counterparty to the transaction. As examples, the offering may include a proposal to a new or existing prospect, identifying a new prospect, entering a formal or informal relationship with a prospect, or advancing to a next stage in a relationship with a prospect.

iv. Outcome Indicators.

One or more outcome indicators may be associated with a historical opportunity profile 108. The one or more outcome indicators may be included in the set of opportunity parameters associated with a historical opportunity profile 108. As examples, outcome indicators may include economic outcomes, social outcomes, behavioral outcomes, process outcomes, or production outcomes. Outcome indicators may include objective parameters or subjective parameters. Outcome indicators may include numerical values, qualitative values, statistical values, measured values, or calculated values. One or more outcome indicators pertaining to a particular historical opportunity may be utilized, individually or in combination, to make inferences about the historical opportunity. Additionally, or in the alternative, one or more outcome indicators may be utilized, individually or in combination, to make inferences about a group or category of historical opportunities. In one example, an inference can be made about a group or category of historical opportunities based on one or more outcome indicators from a sample of historical opportunities.

In one example, an outcome indicator may represent a binary outcome. A binary outcome refers to an outcome that is one or two possible alternatives. As examples, a binary outcome may include win/lose, favorable/unfavorable, success/failure, progress/setback, yes/no, start/stop, or expedite/delay. In one example, a binary outcome, such as win/lose, may indicate whether a historical opportunity was won or lost. In one example, a binary outcome, such as good/bad, may indicate whether an outcome of a historical opportunity was a favorable outcome or an unfavorable outcome. In one example, a binary outcome, such as success/failure, may indicate whether a historical opportunity was considered a success or a failure. In one example, a binary outcome, such as progress/setback, may indicate whether a historical opportunity resulted in making progress or incurring a setback. In one example, a binary outcome, such as yes/no, may indicate whether a historical opportunity resulted in a decision in the affirmative (e.g., "yes"), or a decision in the negative (e.g., "no"). In one example, a binary outcome, such as start/stop, may indicate whether a historical opportunity resulted in a decision to start or stop a course of action. In one example, a binary outcome, such as expedite/delay, may indicate whether a historical opportunity resulted in a decision to expedite or delay a course of action.

In one example, an outcome indicator may represent a multivariate outcome. A multivariate outcome refers to an outcome that is one of a defined set of more than two possible outcomes. The defined set of possible outcomes may include an incremental scale, a set of categories, or a set of alternatives. The defined set of possible outcomes may include qualitative outcomes or quantitative outcomes. In one example, a multivariate outcome may indicate an extent to which an outcome of the opportunity may be regarded as at least one of: a win or a loss, a favorable outcome or an unfavorable outcome, a success or a failure, or a progress or a setback. In one example, a multivariate outcome may include a number selected from a low number to a high number, such as from 1 to 10. In one example, a multivariate outcome may include a label, a classification, or a characterization selected from a group. In one example, a multivariate outcome may include a rating scale, such as a Numeric Rating Scale (NRS), a Verbal Rating Scale (VRS), a Visual Analogue Scale (VAS), a Likert scale, a graphic rating scale, or a descriptive graphic rating scale. An example rating scale may include a set of alternatives, such as: strongly disagree, disagree, neither agree nor disagree, agree, or strongly agree.

In one example, an outcome indicator may represent an outcome based on a performance metric. The indication of the outcome may include at least one of: a value for the performance metric, an indication as to whether the value for the performance metric meets a threshold (e.g., a goal or a benchmark), or an indication as to a range (such as from a set of ranges) the value for the performance metric falls within. As examples, the performance metric may include one or more of: total sales value, return on investment (ROI), return on equity (ROE), return on assets (ROA), return on sales (ROS), return on marketing investment (ROMI), gross profit margin (GPM), customer acquisition cost (CAC), customer lifetime value (CLV), sales cycle length, time to close, or the like. In one example, an outcome indicator that represents an outcome based on a performance metric may indicate whether a historical opportunity met a threshold for total sales value, such as a goal or a benchmark for total sales value.

In one example, an outcome indicator may represent an outcome based on a time parameter. The indication of the outcome may include at least one of: an elapsed time, an indication as to whether the elapsed time meets a threshold (e.g., a deadline or a benchmark), or an indication as to a range (such as from a set of ranges) the elapsed time falls within. The elapsed time may be determined from a start time to an end time. The start time may correspond to a time when pursuit of an opportunity commences. The end time may correspond to a time when pursuit of the opportunity closed. Additionally, or in the alternative, the elapsed time, the start time, or the end time may respectively correspond to one or more intermediate stages of an opportunity.

iv. Opportunity Profile Clusters.

Referring further to FIG. 1A, the data corpus 106 may additionally include a set of opportunity profile clusters 110. The opportunity profile clusters 110 may respectively include a subset of the historical opportunity profiles 108, from the set of historical opportunity profiles 108, that have been grouped together by one or more clustering models. An opportunity profile cluster 110 represents a group of historical opportunity profiles 108 that meet one or more similarity or distance measures utilized by the one or more clustering models. The historical opportunity profiles 108 in an opportunity profile cluster 110 represent a group of historical opportunity profiles 108 that are more similar to one another than to other historical opportunity profiles 108 that are not included in the opportunity profile cluster 110, such as a different group of historical opportunity profiles 108 in a different opportunity profile cluster 110. The opportunity profile clusters 110 may be generated without pre-existing labels or categories for the historical opportunity profiles 108. For example, the one or more similarity or distance measures may be determined without prior knowledge of opportunity parameters or outcome indicators for the respective historical opportunity profiles 108. In one example, the one or more clustering models may refrain from grouping historical opportunity profiles 108 in an opportunity profile cluster 110 on the basis of one or more outcome indicators.

An opportunity profile cluster 110 may represent one or more similarity or distance measures pertaining to the structure of the data represented by the historical opportunity profiles 108, including, for example, one or more of: an arrangement or distribution of the data represented by the historical opportunity profiles 108 in the opportunity profile cluster 110, or a relationship, pattern, or correlation between different variables or features of the historical opportunity profiles 108 in the opportunity profile cluster 110. While at least some of the historical opportunity profiles 108 in an opportunity profile cluster 110 may share one or more similar characteristics or properties (including, for example, similar opportunity parameters or similar outcome indicators), the similarity or distance measures are based on the structure of the data represented by the historical opportunity profiles 108, as opposed to similar opportunity parameters or similar outcome indicators themselves.

The opportunity profile clusters 110 may represent similarities, differences, patterns, relationships, or the like, that may not be immediately apparent. For example, by refraining from grouping historical opportunity profiles 108 in an opportunity profile cluster 110 based on one or more outcome indicators, patterns or relationships may be identified without introducing bias based on the one or more outcome indicators. In one example, patterns or relationships may be identified that are independent of one or more outcome indicators. As described in further detail below, after the historical opportunity profiles 108 are grouped in opportunity profile clusters 110, the historical opportunity profiles 108 in a respective opportunity profile cluster 110 may be subsequently partitioned into subsets of historical opportunity profiles 108 based on one or more outcome indictors. Additionally, or in the alternative, the historical opportunity profiles 108 in a respective opportunity profile cluster 110 may be subsequently partitioned into subsets of historical opportunity profiles 108 based on one or more opportunity parameters. The subsequent partitioning may reveal similarities, differences, patterns, relationships, or the like, for the respective subsets representing the outcome indicators, while refraining from initially biasing the opportunity profile cluster 110 based on the outcome indicators.

Referring to FIG. 1B, example opportunity profile clusters 110 are shown. Historical opportunity profiles 108 may be partitioned into any number of opportunity profile clusters 110 (e.g., opportunity profile cluster 110a and opportunity profile cluster 110b). Any cluster may be partitioned in subsets of opportunity profiles (e.g., subset 114a and subset 114b). Each opportunity profile (e.g., opportunity profiles 108a-108f) may be stored in association with a respective outcome indicator (e.g., outcome indicator 112a-112f).

As shown, a set of opportunity profile clusters 110 in a data repository 102 may include one or more opportunity profile clusters (e.g., opportunity profile cluster 110a and an opportunity profile cluster 110b) that respectively represent groupings based on one or more similarity or distance measures pertaining to the structure of the data represented by the historical opportunity profiles 108. The respective opportunity profile clusters 110 may include a set of historical opportunity profiles 108. For example, opportunity profile cluster 110a may include historical opportunity profiles 108a and 108b. As shown, the opportunity profile clusters 110 may be stored in a data structure that associates an outcome indicator 112 with each of the historical opportunity profiles 108 in the opportunity cluster 110 (e.g., outcome indicator 112a is associated with opportunity profile 108a, and outcome indicator 112b is associated with opportunity profile 108b). The outcome indicators 112 associated with historical opportunity profiles in an opportunity cluster 110 may be the same or different from one another. The opportunity profile clusters 110 may represent groupings of historical opportunity profiles 108 determined without pre-existing labels or categories for the outcome indicators of the respective historical opportunity profiles 108. As a result, different outcome indicators 112 may be associated with various historical opportunity profiles 108 in the respective opportunity profile clusters 110.

The historical opportunity profiles 108 in an opportunity profile cluster 110 may be partitioned into subsets 114 (e.g., subset 114a and subset 114b). In one example, the subsets 114 may be partitioned from one another based on one or more outcome indicators 112. The subsets 114 may represent similarities, differences, patterns, relationships, or the like, that are based on the respective outcome indicator 112. For example, outcome indictors 112c and 112d may represent one kind of outcome, and outcome indicators 112e and 112f may represent another kind of outcome. In one example, outcome indicators 112c and 112d may indicate a favorable outcome, such as having won a potential prospect, and outcome indicators 112e and 112f may represent an unfavorable outcome, such as having lost a potential prospect.

v. Target Opportunity Profiles.

Referring again to FIG. 1A, the data repository 102 may include one or more target opportunity profiles 116 respectively corresponding to a target opportunity. A target opportunity profile 116 may be associated with a target opportunity in one or more fields of opportunity, including those described above. The target opportunity profiles 116 may be arranged in a data structure of the data repository 102 that includes, for each target opportunity, an identifier of the opportunity, and a plurality of opportunity parameters associated with the opportunity. The opportunity parameters associated with a target opportunity profile 116 may include any one or more of the values, variables, features, characteristics, conditions, criteria, or limits pertaining to the opportunity as described above. In one example, the plurality of opportunity parameters may include at least one of: transaction parameters, segmentation parameters, personnel parameters, or prospect parameters. One or more of the opportunity parameters associated with a target opportunity profile 116 may correspond to one or more of the opportunity parameters associated with one or more historical opportunities. Additionally, or in the alternative, one or more of the opportunity parameters associated with a target opportunity profile 116 may differ with respect to one or more of the opportunity parameters associated with one or more historical opportunities. The opportunity parameters associated with a target opportunity profile 116 may sometimes be referred to as target-opportunity parameters.

vi. Insights.

The data repository 102 may include insights 118 determined by the insight generation system 104. The insights 118 may be associated with one or more target opportunity profiles 116. The insights 118 may be generated by the insight generation system 104 based at least in part on a comparison of a target opportunity profile 116 with one or more opportunity profile clusters 110, such as with one or more subsets 114 corresponding to a respective opportunity profile cluster 110.

B. Insight Generation System Modules.

As shown in FIG. 1A, the insight generation system 104 may include one or more of: a clustering engine 120, a matching module 122, a partitioning module 124, or an insight engine 126. The clustering engine 120 may include, or may be configured to access, one or more clustering models 128. The clustering engine 120 may utilize the one or more clustering models 128 to generate opportunity profile clusters 110. The matching module 122 may include, or may be configured to access, one or more matching criteria 130. The matching module 122 may utilize the one or more matching criteria 130 to match target opportunity profiles 116 to opportunity profile clusters 110. The partitioning module 124 may include, or may be configured to access, one or more partitioning criteria 132. The partitioning module 124 may utilize the one or more partitioning criteria 132 to partition a set of historical opportunity profiles 108 of an opportunity profile cluster 110 into a plurality of subsets of historical opportunity profiles 108 based on one or more outcome indicators 112 associated with the historical opportunity profiles 108 in the opportunity profile cluster 110. The insight engine 126 may include, or may be configured to access, one or more insight generation models 134. The insight engine 126 may utilize the one or more insight generation models 134 to generate insights 118 based on a comparison of the target opportunity profile 116 to an opportunity profile cluster 110 or to one or more of the subsets of historical opportunity profiles 108 corresponding to the opportunity profile cluster 110.

i. Clustering Models.

The one or more clustering models 128 utilized by the clustering engine 120 may be configured to group historical opportunity profiles 108 into one or more opportunity profile cluster 110 based on one or more similarity or distance measures without pre-existing labels or categories for the historical opportunity profiles 108. The one or more clustering models 128 may include one or more machine learning models, such as one or more unsupervised machine learning models, supervised machine learning models, or one or more semi-supervised machine learning models. Additionally, or in the alternative, the one or more clustering models 128 may include one or more classical models. In one example, a clustering model 128 may include one or more machine-learning components and one or more classical statistical components.

Different clustering models 128 may be utilized by the clustering engine 120 for different purposes. In one example, the clustering engine 120 may utilize a one clustering model 128a to generate one group of opportunity profile clusters 110 and another clustering model 128n to generate another opportunity profile clusters 110. Additionally, or in the alternative, the clustering engine 120 may utilize multiple clustering models 128 (e.g., clustering model 128a and clustering model 128n) to generate opportunity profile clusters 110.

The one or more clustering models 128 may be configured to group historical opportunity profiles 108 into one or more opportunity profile cluster 110 based on one or more of: strict partitioning, strict partitioning with outliers, or overlapping clustering. For strict partitioning, each historical opportunity profile 108 belongs to exactly one opportunity profile cluster 110. For strict partitioning with outliers, historical opportunity profiles 108 can also belong to no opportunity profile cluster 110, in which case they are considered outliers.

In one example, a clustering model may include at least one of: a centroid model, a connectivity model, a density model, a distribution model, a graph-based model, a neural model, or a subspace model.

A centroid model may include one or more components that groups similar data points together based on their proximity to a central point, or a centroid. The centroid may be calculated based on a mean or median of the values of the data points in the cluster. An example centroid model includes a k-means clustering model. The k-means clustering model may include one or more components that partition data points into k clusters, where k is a user-defined parameter. The k-means clustering model may randomly select k centroids (or cluster centers) and then assign each data point to the nearest centroid. The centroids may be updated iteratively by computing the mean of the data points assigned to each cluster until convergence.

A connectivity model may include one or more components that describe relationships between different aspects of a data set based on their proximity or spatial contiguity. The one or more components in a connectivity model may generate clusters that can be described by a maximum distance needed to connect parts of the cluster. At different distances, different clusters will form, which can be represented using a dendrogram or hierarchical tree.

A density model may include one or more components that define clusters based on areas of higher density relative to the remainder of the data set. For example, a density model may estimate a probability density function (PDF) of a dataset. The PDF may represent a probability of a data point occurring at a given value or range of values for each variable in the dataset. An example density model may include a kernel density estimation model, a Gaussian mixture model, or an autoencoder model.

A distribution model may include one or more components that describe a probability distribution of a set of data. The probability distribution may represent a pattern of frequencies that a set of data follows. A distribution model may describe the distribution of the data, such as a central tendency, a spread, or a shape. An example distribution model may include a Gaussian mixture model configured to generate a number of Gaussian distributions that are initialized randomly and whose parameters are iteratively optimized to better fit the data set.

A graph-based model may include one or more components that represent data as a graph that includes a collection of nodes and edges that connect the nodes. The nodes may represent an object or entity, and the edges may represent a relationship or interaction between the objects. An example graph-based model may include a graph neural network, a random walk model, a signed graph model, or a community detection model.

A subspace model may include one or more components that analyze and represent data in a lower-dimensional space or subspace. An example subspace model may include one or more components configured to perform at least one of: anomaly detection, principal component analysis (PCA), linear discriminant analysis (LDA), or non-negative matrix factorization (NMF).

ii. Matching Criteria.

As mentioned, the matching module 122 may utilize the one or more matching criteria 130 to match target opportunity profiles 116 to opportunity profile clusters 110. A target opportunity profile 116 may be matched to an opportunity profile cluster 110 based on the one or more matching criteria 130. The matching module 122 may identify an opportunity profile cluster 110, from a set of opportunity profile clusters 110, that best meet the one or more matching criteria 130. The matching criteria 130 may be utilized to compare one or more characteristics of the target opportunity profile 116 with one or more characteristics of the respective opportunity profile clusters 110. A target opportunity profile 116 may be matched to an opportunity profile cluster 110 that has a highest match score among the set of opportunity profile clusters 110. Additionally, or in the alternative, a target opportunity profile 116 may be matched to an opportunity profile cluster 110 corresponding to a match score that meets a threshold. In one example, the target opportunity profile 116 may be matched to a plurality of opportunity profile clusters 110 that respectively correspond to a match score meets the threshold.

In at least one example, the matching module 122 may scale or normalize the data represented by the opportunity profile clusters 110 and/or the target opportunity profile 116 before comparing the target opportunity profile 116 to the opportunity profile clusters 110 using the matching criteria 130. Additionally, or in the alternative, one or more dimensionality reduction operations may be performed, for example, upon one or more high-dimensional aspects of the data represented by the opportunity profile clusters 110. The dimensionality reduction operations may include principal component analysis (PCA) or t-distributed stochastic neighbor embedding (t-SNE).

In at least one example, the matching criteria 130 may include selecting a subset of opportunity parameters for comparison of the target opportunity profile 116 to the opportunity profile clusters 110. For example, the subset may include a subset of the transaction parameters, a subset of the personnel parameters, or a subset of the prospect parameters. Additionally, or in the alternative, the subset may include all or a subset of the transaction parameters, exclusive of personnel parameters and/or the prospect parameters. Additionally, or in the alternative, the subset may include all or a subset of the personnel parameters and/or all or a subset of the prospect parameters, exclusive of transaction parameters.

In one example, the matching criteria 130 may be based on at least one of: a distance metric, a probability distribution, a classification, or a similarity measure. A distance metric may represent the similarity between the target opportunity profile 116 and the historical opportunity profiles 108 in a respective opportunity profile cluster 110. Additionally, or in the alternative, the similarity may be determined between the target opportunity profile 116 and a centroid of the historical opportunity profiles 108 in a respective opportunity profile cluster 110. The centroid may represent an average value of all the historical opportunity profiles 108 in the opportunity profile cluster 110. The distance metric may be determined for one or more of the opportunity parameters corresponding to the historical opportunity profiles 108. In one example, the similarity may be determined based on a Euclidean distance metric, or a cosine similarity metric. The matching criteria 130 may include determining whether a respective opportunity profile cluster 110 meets a threshold distance metric with respect to the target opportunity profile 116. The target opportunity profile 116 may be matched to an opportunity profile cluster 110 that meets the threshold distance metric.

Additionally, or in the alternative, a probability distribution may be utilized to determine a probability that a target opportunity profile 116 belongs to respective opportunity profile clusters 110. In one example, the probability distribution may be modeled using a Gaussian mixture model. Additionally, or in the alternative, a classification model may be utilized to predict an opportunity profile cluster 110 that a target opportunity profile 116 would belong to, for example, if the target opportunity profile 116 were included in the set of historical opportunity profiles 108 from which the opportunity profile clusters 110 were generated. The classification model may be trained on labeled data generated from the opportunity profile clusters 110. In one example, the classification model may include a decision tree, a support vector machine, or a neural network classifier. Additionally, or in the alternative, a similarity measure may be utilized to compare the target opportunity profile 116 to each historical opportunity profile 108 in the respective opportunity profile clusters 110. The similarity measure may be based on cosine similarity or Jaccard similarity.

iii. Partitioning Criteria.

As mentioned, the partitioning module 124 may utilize the one or more partitioning criteria 132 to partition a set of historical opportunity profiles 108 of an opportunity profile cluster 110 into a plurality of subsets of historical opportunity profiles 108 based on one or more outcome indicators 112. The one or more partitioning criteria 132 may include partitioning the historical opportunity profiles 108 based on an outcome indicator that represents a binary outcome or a multivariate outcome. In one example, a partitioning criterion 132 may partition the historical opportunity profiles 108 based on a binary outcome indicator that indicates whether the opportunity was won or lost. Additionally, or in the alternative, a partitioning criterion 132 may partition the historical opportunity profiles 108 based on a multivariate outcome indicator that indicates an extent to which the outcome may be regarded as a win or a loss, for example, according to a rating scale.

In one example, the partitioning module 124 may execute a series or sequence of partitioning operations that respectively utilize one or more partitioning criteria. In one example, the partitioning criteria 132 may include a temporal restriction. The temporal restriction may limit the population of historical opportunity profiles 108 based on a recency threshold, or based on a date range. In one example, the one or more partitioning criteria 132 may include one or more opportunity parameters. The partitioning module 124 may execute one or more partitioning operations that respectively partition the historical opportunity profiles 108 based on one or more opportunity parameter, for example, in addition to the one or more outcome indicators 112.

Information describing one or more of the historical opportunity profiles 108, the opportunity profile clusters 110, the target opportunity profiles 116, or the insights 118, may be implemented across any of components within the system 100. However, this information is shown within the data repository 102 for purposes of clarity and explanation.
iv. Insight Generation Models.

As mentioned, the insight engine 126 may utilize one or more insight generation models 134 to generate insights 118 based on a comparison of the target opportunity profile 116 to an opportunity profile cluster 110 or to one or more of the subsets of historical opportunity profiles 108 corresponding to the opportunity profile cluster 110. The one or more insight generation models 134 may include one or more machine learning models, such as one or more unsupervised machine learning models, supervised machine learning models, or one or more semi-supervised machine learning models. Additionally, or in the alternative, the one or more insight generation models 134 may include one or more classical models. In one example, an insight generation model 134 may include one or more machine-learning components and one or more classical statistical components.

Different insight generation models 134 may be utilized by the insight engine 126 for different purposes. In one example, the insight engine 126 may utilize one insight generation model 134a to generate one set of insights 118 and another insight generation model 134n to generate another set of insights 118. Additionally, or in the alternative, the insight engine 126 may utilize multiple insight generation models 134 (e.g., insight generation model 134a and insight generation model 134n) to generate a set of insights 118.

In one example, the insight engine 126 may apply an insight generation model 134 to particular subset of historical opportunity profiles 108 and the target opportunity profile 116 to generate a set of insights 118 for the target opportunity profile 116. The particular subset of historical opportunity profiles 108 may correspond to a particular outcome of interest, such wins. Additionally, or in the alternative, the insight engine 126 apply an insight generation model 134 to an additional subset of historical opportunity profiles 108 and the target opportunity profile 116 to generate an additional set of insights 118 for the target opportunity profile 116. The additional subset of historical opportunity profiles 108 may correspond to an additional outcome of interest, such losses. In one example, the insight engine 126 apply an insight generation model 134 to one subset of historical opportunity profiles 108, corresponding, for example, to wins, while refraining from applying the insight generation model 134 to another subset of historical opportunity profiles, corresponding, for example, to losses. For example, the insights 118 may be directed towards insights related to a desired outcome (e.g., wins) so that the target opportunity corresponding to the target opportunity profile 116 may be guided towards the desired outcome (e.g., wins). Additionally, or in the alternative, the insights 118 may be directed towards insights related to an undesired outcome (e.g., losses) so that the target opportunity may be guided away from the undesired outcome (e.g., losses).

The insights 118 generated by the insight engine 126 may indicate one or more opportunity parameters that are missing from the target opportunity profile 116 but that are present in all or a portion of the respective subset of historical opportunity profiles 108. The presence of the one or more opportunity parameters in the subset of historical opportunity profiles 108 may meet a prevalence criterion representing a prevalence of the one or more opportunity parameters in the subset of historical opportunity profiles 108. An insight 118 may identify one or more missing opportunity parameters that meet the prevalence criterion. The insight 118 may indicate that the missing opportunity parameters may influence the outcome, such as a binary outcome or a multivariate outcome, from one outcome to another outcome. Additionally, or in the alternative, the insight 118 may indicate that an action corresponding to the insight, such as adding the missing opportunity parameters, may influence the outcome, such as from a loss to a win.

Additionally, or in the alternative, the one or more insights 118 corresponding to an outcome may indicate one or more opportunity parameters that are present in both the target opportunity profile 116 and all or a portion of the historical opportunity profiles 108 in the subset, and that respectively have a value that differs. The difference in value may be a statistically significant difference, for example, as between the target opportunity profile 116 and the historical opportunity profiles 108. The existence of the difference in the one or more opportunity parameters as between the target opportunity profile 116 and the subset of historical opportunity profiles 108 may meet a prevalence criterion. The prevalence criterion may represent a prevalence of the one or more opportunity parameters being different as between the target opportunity profile 116 and the subset of historical opportunity profiles 108. An insight 118 may identify one or more different opportunity parameters that meet the prevalence criterion. The insight 118 may indicate that the different opportunity parameters may influence the outcome, such as a binary outcome or a multivariate outcome, from one outcome to another outcome. Additionally, or in the alternative, the insight 118 may indicate that an action corresponding to the insight 118, such as changing the one or more opportunity parameters to reduce or eliminate the difference between the target opportunity profile 116 and the subset of historical opportunity profiles 108, may influence the outcome, such as from a loss to a win.

The insight engine 126 may determine, based on the one or more insight generation models 134, that one or more of the missing or different opportunity parameters meet a threshold probability of influencing an outcome of the target opportunity corresponding to the target opportunity profile 116. Additionally, or in the alternative, the insight engine 126 may determine, based on the one or more insight generation models 134, that an action, corresponding to the insight 118, meets a threshold probability of influencing an outcome of the target opportunity corresponding to the target opportunity profile 116. In at least one example, the insight engine 126 may filter or limit insights 118 to those which meet a threshold probability that presenting the insight 118 may influence an outcome of a target opportunity corresponding to the target opportunity profile 116. Additionally, or in the alternative, the insight engine 126 may generate one or more insights 118 based at least in part on a probability of an action, corresponding to the insight 118, meeting a threshold probability of influencing an outcome of the target opportunity corresponding to the target opportunity profile 116. The threshold probability may represent a probability of influencing a binary outcome or a multivariate outcome from alternative to another, such as from a loss to a win, from a win to a loss, or from one extent of a win or a loss to another extent of a win or a loss.

In one example, an insight 118 generated by the insight engine 126 may include one or more opportunity parameters for the target opportunity profile 116 that were not previously associated with the target opportunity profile 116. For example, the insight engine 126 may generate an insight 118 that includes one or more suggested opportunity parameters for the target opportunity profile 116. Additionally, or in the alternative, the insight engine 126 may generate an insight 118 that includes one or more predicted opportunity parameters for the target opportunity profile 116.

In one example, the one or more suggested opportunity parameters for the target opportunity profile 116 may include a suggestion of a person that may be associated with at least one of: a personnel parameter or a prospect parameter. Additionally, or in the alternative, the one or more suggested opportunity parameters may include a suggestion of a person that may be associated with at least one of: an influencer parameter, an advocate parameter, a detractor parameter, or a gatekeeper parameter. In one example, the one or more suggested opportunity parameters may include a transactional parameter or a performance indicator.

In one example, the one or more predicted opportunity parameters may include a transactional parameter or a performance indicator. In one example, an insight 118 may include one or more suggested opportunity parameters and one or more corresponding predicted opportunity parameters associated with proceeding or not-proceeding with the one or more suggested opportunity parameters. The one or more suggested opportunity parameters may include one or more personnel parameters and/or prospect parameters for the target opportunity profile 116 (e.g., an influencer parameter, an advocate parameter, a detractor parameter, or a gatekeeper parameter). Additionally, or in the alternative, the insight 118 may include one or more predicted outcome indicators associated with the one or more suggested opportunity parameters.

v. Model Algorithms.

As mentioned, the insight generation system 104 may utilize one or more machine learning models and/or one or more classical models. A machine learning model may include one or more machine-learning algorithms configured to automatically learn relevant patterns and relationships in data, for example, without the need for manual feature selection or strong assumptions about the data distribution. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

In one or more embodiments, a machine learning model may include one or more machine learning algorithms that can be iterated to learn a target model f that best maps a set of input variables to an output variable. In particular, a machine learning algorithms may be configured to generate and/or train a machine learning model.

A machine learning algorithms can be iterated to learn a target model f that best maps a set of input variables to an output variable, using a set of training data. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithms, which in turn updates the target model f.

A machine learning algorithm may generate a target model f such that the target model f best fits the datasets of training data to the labels of the training data. Additionally, or alternatively, a machine learning algorithm may generate a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, and random forest, boosting, backpropagation, and/or clustering.

In one or more embodiments, as shown in FIG. 1A, the system 100 may include a model trainer 136 that includes one or more machine learning algorithms configured to generate and/or train a machine learning model. In one example, the model trainer 136 may obtain a plurality of training data sets, such as from the data repository 102. The model trainer 136 may train a machine learning model utilized by the insight generation system 104 based at least in part on the plurality of training data sets. In one example, the model trainer 136 may train a machine learning model utilized by the clustering engine 120. In one example, the model trainer 136 may train a machine learning model utilized by the insight engine 126.

The plurality of training data sets may respectively include one or more historical opportunity profiles, and one or more insights for the one or more historical opportunity profiles. For example, the training data sets may include a historical opportunity profile, and an insight for the historical opportunity profile. Additionally, or in the alternative, the plurality of training data sets may respectively include an opportunity profile cluster 110, or a subset of historical opportunity profiles 108 partitioned from the opportunity profile cluster 110 (e.g., based on an outcome indicator), and at least one insight for the opportunity profile cluster 110 or the subset of historical opportunity profiles 108.

C. System Interfaces.

Referring further to FIG. 1A, an insight generation system 104 may receive inputs 138 from various sources and may generate outputs 140 to various sources. For example, the inputs 138 may include content from the data repository 102, upon which the insight generation system 104 may execute operations, and the outputs 140 may include insights 118. Additionally, or in the alternative, the outputs 140 may include data to be stored in the data repository 102 and/or data to be transmitted to a source, such as responsive to operations performed by insight generation system 104. In one example, the source may include an external resource that utilizes, or that is utilized by, the insight generation system 104.

The system 100 may include a user device interface 142 communicatively coupled or couplable with the insight generation system 104 and/or the data repository 102. The user device interface 142 may include hardware and/or software configured to facilitate interactions between a user and various aspects of the system 100, such as the insight generation system 104 and/or the data repository 102. The user device interface 142 may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user device interface 142 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user device interface 142 may be specified in one or more other languages, such as Java, C, or C++.

The system 100 may include a communications interface 144 communicatively coupled or couplable with the insight generation system 104 and/or the data repository 102. The communications interface 144 may include hardware and/or software configured to transmit data to and/or from the system 100, and or between respective components of the system 100. For example, the communications interface 144 may transmit and/or receive data between and/or among the insight generation system 104, the data repository 102, the user device interface 142, including transmitting and/or receiving inputs 138 and/or outputs 140.

In one example, the insight generation system 104 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. Generating Insights For Target Opportunities

Referring now to FIG. 2, the presently disclosed subject matter is further described. FIG. 2 illustrates an example set of operations 200 in accordance with one or more embodiments. The operations 200 may be associated with the data repository 102 and/or the insight generation system 104. One or more operations shown in FIG. 2 may be modified, rearranged, or omitted all together. Accordingly, the particular sequence of operations shown in FIG. 2 should not be construed as limiting the scope of one or more embodiments.

Various components of the system 100 may be utilized to perform the operations 200. The operations 200 may include one or more of: generating opportunity profile clusters, partitioning opportunity profile clusters into subsets of historical opportunity profiles, matching target opportunity profiles to an opportunity profile cluster and/or to a subset of historical opportunity profiles, and/or generating insights for target opportunity profiles.

As shown in FIG. 2, the operations 200 may include, at block 202, applying a clustering model to a set of historical opportunity profiles to partition the set of historical opportunity profiles into a plurality of opportunity profile clusters. The historical opportunity profiles may be obtained from a data corpus, for example, by executing a query using an application programming interface (API). The clustering model may be applied to the set of historical opportunity profiles using the clustering engine, for example, as describe with reference to FIG. 1A, to pass the data representing the set of historical opportunity profiles through the clustering model. The clustering model may output the plurality of opportunity profile clusters. The opportunity profile clusters may be stored in the data corpus.

At block 204, the operations 200 may include obtaining a target opportunity profile that includes a plurality of target-opportunity parameters. The target opportunity profile may be obtained from a data corpus. The target opportunity profile may be obtained by downloading the data representing the target opportunity profile to the insight generation system. For example, the insight generation system may utilize an API to execute a query on the data corpus. Additionally, or in the alternative, the target opportunity profile may be provided from a user device interface.

At block 206, the operations 200 may include comparing an opportunity profile cluster to the target opportunity profile. The opportunity profile cluster may be selected from the opportunity profile clusters stored in the data corpus and/or from the opportunity profile clusters generated by the clustering engine.

At block 208, the operations 200 may include determining whether the target opportunity profile meets a matching criterion with respect to the opportunity profile cluster, for example, based on the comparison at block 206. For an opportunity profile that does not meet the matching criterion, the operations may proceed to determine, at block 210, whether there is an additional opportunity profile cluster to which the target opportunity profile may be compared. If there is an additional opportunity profile cluster, the operations 200 may return to block 206, where the target opportunity profile may be compared to the additional opportunity profile cluster. The target opportunity profile may be compared to additional opportunity profile clusters until an opportunity profile cluster is identified that meets the matching criterion. Additionally, or in the alternative, the target opportunity profile may be compared to a plurality of opportunity profile clusters and an opportunity profile cluster that best matches the target opportunity may be selected. With an opportunity profile cluster having been identified that meets the matching criterion, the operations may proceed to block 212. If there are no opportunity profile clusters that meet the matching criterion, the operations may proceed to block 204, where another target opportunity profile may be obtained.

At block 212, the operations 200 may include partitioning the plurality of historical opportunity profiles in the opportunity profile cluster into subsets of historical opportunity profiles. The subsets of historical opportunity profiles may include at least two subsets of historical opportunity profiles. The partitioning may be performed based on an outcome indicator associated respectively with each of the historical opportunity profiles. The partitioning may result in one subset of historical opportunity profiles associated with opportunities one, another subset associated with opportunities lost, and another subset associated with conversions within two weeks of a sales pitch.

At block 214a, the operations 200 may include apply an insight generation model to one or more of the subsets of historical opportunity profiles and the target opportunity profile to generate insights for the target opportunity profile. In one example, the insight generation model may be applied to a single subset of opportunity profiles to generate one or more insights for the target opportunity profile specifically pertaining to that subset. In one example, the insight generation model may be applied to a subset corresponding to opportunities won, for example, to generate insights for the target opportunity profile that may indicate differences or similarities between the target opportunity profile and the subset of historical opportunity profiles corresponding to opportunities won. These insights may be utilized to make changes to the target opportunity profile, for example, to align with the subset of historical opportunity profiles corresponding to opportunities won. Additionally, or in the alternative, these insights may indicate opportunity parameters that should not be changed, for example, based on their alignment with the subset of historical opportunity profiles corresponding to opportunities won. In another example, the insight generation model may be applied to a subset corresponding to opportunities lost, for example, to generate insights for the target opportunity profile that may indicate differences or similarities between the target opportunity profile and the subset of historical opportunity profiles corresponding to opportunities lost. These insights may be utilized to make changes to the target opportunity profile, for example, to differentiate the target opportunity profile from the subset of historical opportunity profiles corresponding to opportunities lost. At block 216, the operations 200 may include displaying or storing the one or more insights for the target opportunity profile. The insights may be displayed on a user device interface. The insights for the target opportunity profile may be stored in the data repository.

4. Example Insights

Figure 3:
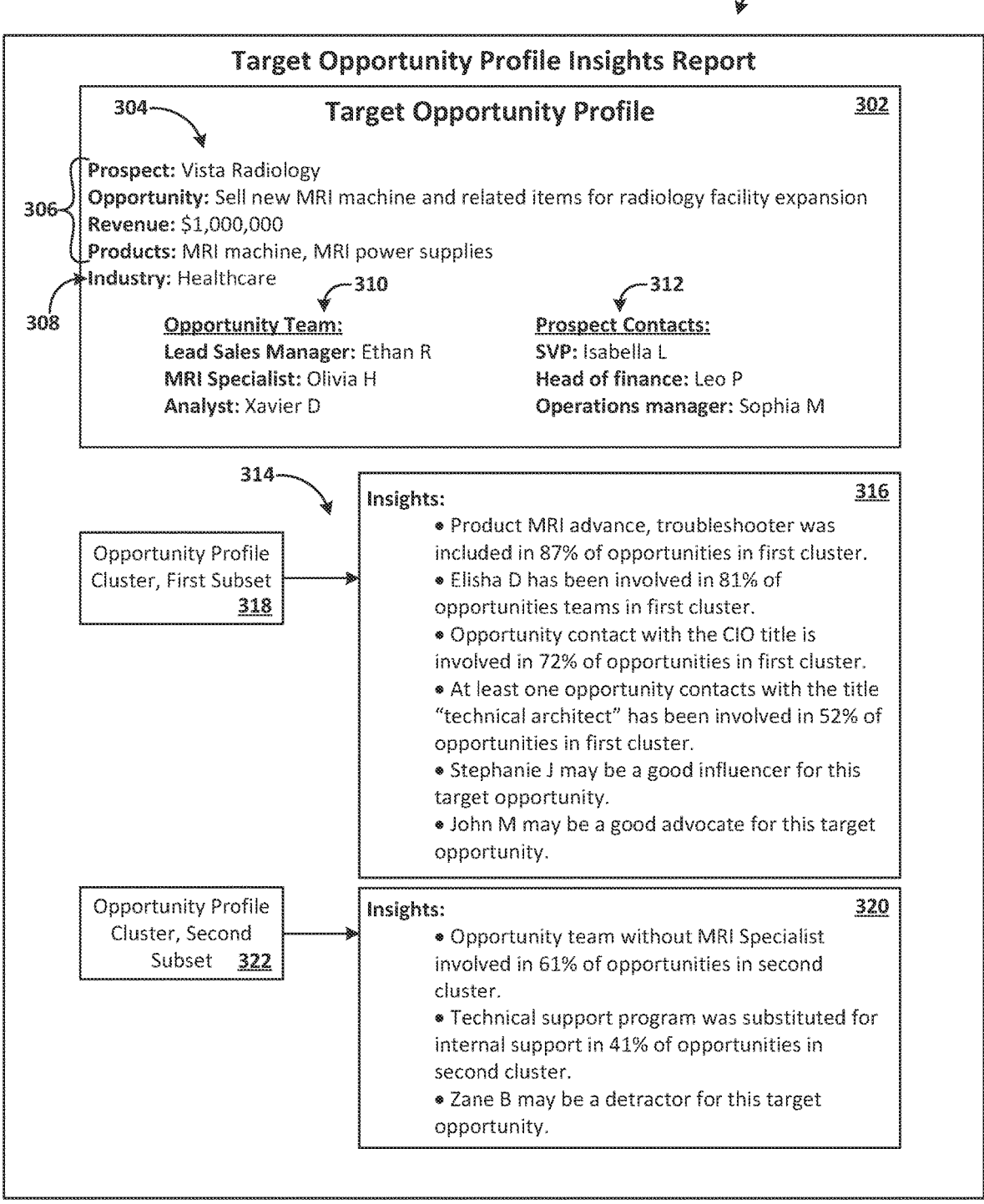
FIG. 3 illustrates an example opportunity profile insights report accordance with one or more embodiments.

Referring now to FIG. 3, in one example, insights generated for a target opportunity profile may be displayed, for example, on a user device interface, in the form of a report 300. The report may be displayed on a user device interface or stored in a data repository.

As shown, the report 300 may include a target opportunity profile 302. The target opportunity profile 302 may include a plurality of target-opportunity parameters 304. For example, as shown, the target-opportunity parameters 304 may include at least one of: one or more transaction parameters 306, one or more segmentation parameters 308, one or more personnel parameters 310, or one or more prospect parameters 312.

The report 300 may further include one or more insights 314. The one or more insights 314 may include one or more insights 316 associated with a particular subset of historical opportunity profiles 318 from an opportunity profile cluster that matches the target opportunity profile 302. Additionally, or in the alternative, the one or more insights 314 may include one or more second insights 320 associated with an additional subset of historical opportunity profiles 322 from the opportunity profile cluster that matches the target opportunity profile 302.

5. Practical Applications, Advantages & Improvements

In one example, the disclosed systems and methods may be implemented in the context of opportunity management systems used to track and manage opportunities in various fields of opportunity. Example opportunity management systems may include customer relationship management system, business-to-business (or partner) relationship management systems, supply chain management systems, community or citizen relationship management systems, campaign management systems, or the like. The insights generated by the disclosed systems or methods may be utilized to improve outcomes of the opportunities, such as the likelihood of successfully closing opportunities and/or performance metrics associated with opportunities in a variety of fields of opportunity.

The disclosed systems and methods improve data analysis technology associated with opportunity management systems at least by providing insights based on objective analysis of historical opportunities that may be used to influence outcomes of target opportunities while avoiding biasing the insights based on the outcomes of the historical opportunities. The insights may be provided by a machine learning model, and the machine learning model may be trained using training data sets that include historical opportunity profiles and one or more insights for the historical opportunity profiles. The machine learning model may be improved over time as target opportunities are converted to historical opportunities associated with one or more insights generated by the machine learning model. As a result, the disclosed systems and methods may provide increasingly insightful information based on the machine learning model.

Further, advantageously, in accordance with the disclosed systems and methods, the opportunity profile clusters may be generated without partitioning the historical opportunity profiles based on their outcome. By refraining from partitioning the opportunity profile clusters based on the outcome of the historical opportunity profiles, patterns or relationships may be identified without introducing bias based on outcomes. For example, patterns or relationships may be identified that are independent of outcome. After the opportunity profile clusters have been generated, the historical opportunity profiles in an opportunity profile cluster may be partitioned, including based outcome. In this way, insights may be revealed that may explain why one subset of historical opportunity profiles in the opportunity profile cluster resulted in a particular outcome, such as a favorable outcome, while another subset of historical opportunity profile clusters resulted in a different outcome, such as an unfavorable outcome.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
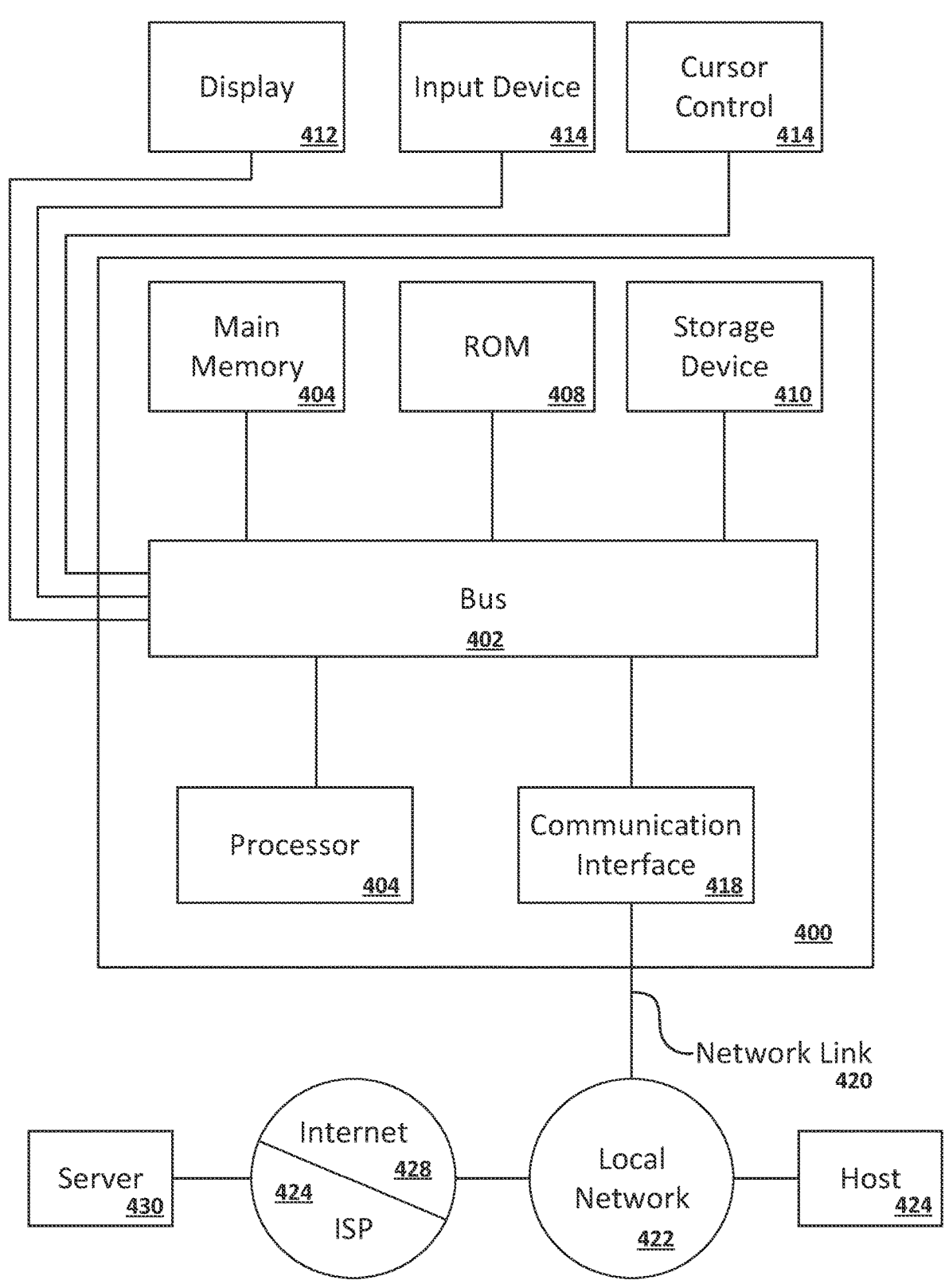
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

applying a clustering model to a set of historical opportunity profiles representing historical opportunities to partition the set of historical opportunity profiles into a plurality of opportunity profile clusters;

obtaining a target opportunity profile comprising a plurality of target-opportunity parameters;

identifying a particular opportunity profile cluster, from the plurality of opportunity profile clusters, that meets one or more matching criteria with the target opportunity profile, each of the historical opportunity profiles of the particular opportunity profile cluster being associated with one of a plurality of outcome indicators;

based at least in part on the outcome indicator associated respectively with each of the plurality of historical opportunity profiles: partitioning the plurality of historical opportunity profiles, of the particular opportunity profile cluster, into a plurality of subsets of historical opportunity profiles, the plurality of subsets of historical opportunity profiles comprising a first subset of historical opportunity profiles and a second subset of historical opportunity profiles;

applying an insight generation model to the first subset of historical opportunity profiles and the target opportunity profile to generate an insight for the target opportunity profile;

displaying or storing the insight for the target opportunity profile.

2. The non-transitory computer readable medium of claim 1, comprising further instructions which, when executed by the one or more hardware processors, causes performance of further operations, comprising:

applying the clustering model to the set of historical opportunity profiles, at least by:

applying a machine learning model configured to execute an unsupervised learning algorithm on the set of historical opportunity profiles, the machine learning model outputting the plurality of opportunity profile clusters;

wherein each of the historical opportunity profiles are associated with one of the plurality of outcome indicators, and wherein the machine learning model refrains from partitioning the set of historical opportunity profiles based at least in part on the plurality of outcome indicators.

3. The non-transitory computer readable medium of claim 1, comprising further instructions which, when executed by the one or more hardware processors, causes performance of further operations, comprising:

applying the insight generation model to generate the insight, at least by:

identifying an opportunity parameter that (a) meets a prevalence criterion in relation to the particular opportunity profile cluster and (b) is not included in the target opportunity profile;

identifying the opportunity parameter in the insight.

4. The non-transitory computer readable medium of claim 1, wherein the insight generation model comprises a machine learning model;

wherein the operations further comprise:

obtaining a plurality of training data sets, wherein a first training data set of the plurality of training data sets comprises:

a first historical opportunity profile, and an insight for the first historical opportunity profile;

training the machine learning model based at least in part on the plurality of training data sets; and wherein applying the insight generation model comprises applying the machine learning model to the first subset of historical opportunity profiles and the target opportunity profile.

5. The non-transitory computer readable medium of claim 1, wherein applying the insight generation model to generate the insight comprises:

identifying an opportunity parameter that meets a prevalence criterion in relation to the particular opportunity profile cluster and that meets a threshold difference from a corresponding one of the plurality of target-opportunity parameters;

identifying the opportunity parameter in the insight.

6. The non-transitory computer readable medium of claim 1, wherein applying the insight generation model to generate the insight comprises:

refraining from applying the insight generation model to the second subset of historical opportunity profiles.

7. The non-transitory computer readable medium of claim 1, comprising further instructions which, when executed by the one or more hardware processors, causes performance of further operations, comprising:

applying the insight generation model to the first subset of historical opportunity profiles and the target opportunity profile to generate a first insight for the target opportunity profile; and applying the insight generation model to the second subset of historical opportunity profiles and the target opportunity profile to generate a second insight for the target opportunity profile.

8. The non-transitory computer readable medium of claim 1, wherein the target opportunity profile comprises a target opportunity, and wherein applying the insight generation model to generate the insight for the target opportunity profile comprises:

generating the insight based at least in part on a probability of an action, corresponding to the insight, meeting a threshold probability of influencing an outcome of the target opportunity corresponding to the target opportunity profile.

9. The non-transitory computer readable medium of claim 8, wherein applying the insight generation model to generate the insight for the target opportunity profile comprises:

identifying an opportunity parameter that meets a prevalence criterion in relation to the particular opportunity profile cluster and that meets a threshold difference from a corresponding one of the plurality of target-opportunity parameters; and determining, based at least in part on at least one of the prevalence criterion and the threshold difference, that the action meets the threshold probability of influencing the outcome of the target opportunity.

10. The non-transitory computer readable medium of claim 1, wherein the insight identifies an opportunity parameter missing from the target opportunity profile, and wherein applying the insight generation model to generate the insight comprises:

generating the insight based at least in part on a statistical significance of the opportunity parameter.

11. The non-transitory computer readable medium of claim 10, wherein applying the insight generation model to generate the insight comprises:

generating the insight based at least in part on meeting a threshold probability that presenting the insight may influence an outcome of a target opportunity corresponding to the target opportunity profile.

12. A method, comprising:

applying a clustering model to a set of historical opportunity profiles representing historical opportunities to partition the set of historical opportunity profiles into a plurality of opportunity profile clusters;

obtaining a target opportunity profile comprising a plurality of target-opportunity parameters;

identifying a particular opportunity profile cluster, from the plurality of opportunity profile clusters, that meets at least one matching criteria with the target opportunity profile, each of the historical opportunity profiles of the particular opportunity profile cluster being associated with one of a plurality of outcome indicators;

based at least in part on the outcome indicator associated respectively with each of the plurality of historical opportunity profiles: partitioning the plurality of historical opportunity profiles, of the particular opportunity profile cluster, into a plurality of subsets of historical opportunity profiles, the plurality of subsets of historical opportunity profiles comprising a first subset of historical opportunity profiles and a second subset of historical opportunity profiles;

applying an insight generation model to the first subset of historical opportunity profiles and the target opportunity profile to generate an insight for the target opportunity profile;

displaying or storing the insight for the target opportunity profile;

wherein the method is performed by at least one device including a hardware processor.

13. The method of claim 12, further comprising:

applying the clustering model to the set of historical opportunity profiles, at least by:

applying a machine learning model configured to execute an unsupervised learning algorithm on the set of historical opportunity profiles, the machine learning model outputting the plurality of opportunity profile clusters;

wherein each of the historical opportunity profiles are associated with one of the plurality of outcome indicators, and wherein the machine learning model refrains from partitioning the set of historical opportunity profiles based at least in part on the plurality of outcome indicators.

14. The method of claim 12, further comprising:

applying the insight generation model to generate the insight, at least by:

identifying an opportunity parameter that (a) meets a prevalence criterion in relation to the particular opportunity profile cluster and (b) is not included in the target opportunity profile;

identifying the opportunity parameter in the insight.

15. The method of claim 12, wherein the insight generation model comprises a machine learning model;

wherein the method further comprises:

obtaining a plurality of training data sets, wherein a first training data set of the plurality of training data sets comprises:

a first historical opportunity profile, and an insight for the first historical opportunity profile;

training the machine learning model based at least in part on the plurality of training data sets; and wherein applying the insight generation model comprises applying the machine learning model to the first subset of historical opportunity profiles and the target opportunity profile.

16. The method of claim 12, wherein applying the insight generation model to generate the insight comprises:

identifying an opportunity parameter that meets a prevalence criterion in relation to the particular opportunity profile cluster and that meets a threshold difference from a corresponding one of the plurality of target-opportunity parameters;

identifying the opportunity parameter in the insight.

17. The method of claim 12, wherein applying the insight generation model to generate the insight comprises:

refraining from applying the insight generation model to the second subset of historical opportunity profiles.

18. The method of claim 12, further comprising:

applying the insight generation model to the first subset of historical opportunity profiles and the target opportunity profile to generate a first insight for the target opportunity profile; and applying the insight generation model to the second subset of historical opportunity profiles and the target opportunity profile to generate a second insight for the target opportunity profile.

19. The method of claim 12, wherein the target opportunity profile comprises a target opportunity, and wherein applying the insight generation model to generate the insight for the target opportunity profile comprises:

generating the insight based at least in part on a probability of an action, corresponding to the insight, meeting a threshold probability of influencing an outcome of the target opportunity corresponding to the target opportunity profile.

20. The method of claim 19, wherein applying the insight generation model to generate the insight for the target opportunity profile comprises:

identifying an opportunity parameter that meets a prevalence criterion in relation to the particular opportunity profile cluster and that meets a threshold difference from a corresponding one of the plurality of target-opportunity parameters; and determining, based at least in part on at least one of the prevalence criterion and the threshold difference, that the action meets the threshold probability of influencing the outcome of the target opportunity.

21. The method of claim 12, wherein the insight identifies an opportunity parameter missing from the target opportunity profile, and wherein applying the insight generation model to generate the insight comprises:

generating the insight based at least in part on a statistical significance of the opportunity parameter.

22. The method of claim 21, wherein applying the insight generation model to generate the insight comprises:

generating the insight based at least in part on meeting a threshold probability that presenting the insight may influence an outcome of a target opportunity corresponding to the target opportunity profile.

23. A system comprising:

at least one hardware processor;

the system being configured to execute operations, using the at least one hardware processor, the operations comprising:

applying a clustering model to a set of historical opportunity profiles representing historical opportunities to partition the set of historical opportunity profiles into a plurality of opportunity profile clusters;

obtaining a target opportunity profile comprising a plurality of target-opportunity parameters;

identifying a particular opportunity profile cluster, from the plurality of opportunity profile clusters, that meets at least one matching criteria with the target opportunity profile, each of the historical opportunity profiles of the particular opportunity profile cluster being associated with one of a plurality of outcome indicators;

based at least in part on the outcome indicator associated respectively with each of the plurality of historical opportunity profiles: partitioning the plurality of historical opportunity profiles, of the particular opportunity profile cluster, into a plurality of subsets of historical opportunity profiles, the plurality of subsets of historical opportunity profiles comprising a first subset of historical opportunity profiles and a second subset of historical opportunity profiles;

applying an insight generation model to the first subset of historical opportunity profiles and the target opportunity profile to generate an insight for the target opportunity profile;

displaying or storing the insight for the target opportunity profile.

24. The system of claim 23, wherein the operations further comprise:

applying the clustering model to the set of historical opportunity profiles, at least by:

applying a machine learning model configured to execute an unsupervised learning algorithm on the set of historical opportunity profiles, the machine learning model outputting the plurality of opportunity profile clusters;

wherein each of the historical opportunity profiles are associated with one of the plurality of outcome indicators, and wherein the machine learning model refrains from partitioning the set of historical opportunity profiles based at least in part on the plurality of outcome indicators.

25. The system of claim 23, wherein the operations further comprise:

applying the insight generation model to generate the insight, at least by:

identifying an opportunity parameter that (a) meets a prevalence criterion in relation to the particular opportunity profile cluster and (b) is not included in the target opportunity profile;

identifying the opportunity parameter in the insight.

26. The system of claim 23, wherein the insight generation model comprises a machine learning model;

wherein the operations further comprises:

obtaining a plurality of training data sets, wherein a first training data set of the plurality of training data sets comprises:

a first historical opportunity profile, and an insight for the first historical opportunity profile;

training the machine learning model based at least in part on the plurality of training data sets; and wherein applying the insight generation model comprises applying the machine learning model to the first subset of historical opportunity profiles and the target opportunity profile.

27. The system of claim 23, wherein applying the insight generation model to generate the insight comprises:

identifying an opportunity parameter that meets a prevalence criterion in relation to the particular opportunity profile cluster and that meets a threshold difference from a corresponding one of the plurality of target-opportunity parameters;

identifying the opportunity parameter in the insight.

28. The system of claim 23, wherein applying the insight generation model to generate the insight comprises:

refraining from applying the insight generation model to the second subset of historical opportunity profiles.

29. The system of claim 23, further comprising:

applying the insight generation model to the first subset of historical opportunity profiles and the target opportunity profile to generate a first insight for the target opportunity profile; and applying the insight generation model to the second subset of historical opportunity profiles and the target opportunity profile to generate a second insight for the target opportunity profile.

30. The system of claim 23, wherein the target opportunity profile comprises a target opportunity, and wherein applying the insight generation model to generate the insight for the target opportunity profile comprises:

generating the insight based at least in part on a probability of an action, corresponding to the insight, meeting a threshold probability of influencing an outcome of the target opportunity corresponding to the target opportunity profile.

31. The system of claim 30, wherein applying the insight generation model to generate the insight for the target opportunity profile comprises:

identifying an opportunity parameter that meets a prevalence criterion in relation to the particular opportunity profile cluster and that meets a threshold difference from a corresponding one of the plurality of target-opportunity parameters; and determining, based at least in part on at least one of the prevalence criterion and the threshold difference, that the action meets the threshold probability of influencing the outcome of the target opportunity.

32. The system of claim 23, wherein the insight identifies an opportunity parameter missing from the target opportunity profile, and wherein applying the insight generation model to generate the insight comprises:

generating the insight based at least in part on a statistical significance of the opportunity parameter.

33. The system of claim 32, wherein applying the insight generation model to generate the insight comprises:

generating the insight based at least in part on meeting a threshold probability that presenting the insight may influence an outcome of a target opportunity corresponding to the target opportunity profile.

* * * * *